United States Patent [19]

Li Donnici

[11] 3,999,848

[45] Dec. 28, 1976

[54] AUDIO-VISUAL CARTRIDGE

[75] Inventor: Kenneth Li Donnici, Brooklyn, N.Y.

[73] Assignee: General Audio-Visual Inc., Malverne, N.Y.

[22] Filed: Mar. 15, 1974

[21] Appl. No.: 451,417

[52] U.S. Cl. .................................. 353/120; 353/19
[51] Int. Cl.² ........................................ G03B 21/00
[58] Field of Search ............................. 353/15–19, 353/120, 95; 206/D36; 352/29, 31, 26, 37; 40/95

[56] References Cited

UNITED STATES PATENTS

| 3,174,241 | 3/1965 | Rohan | 40/95 |
| 3,177,768 | 4/1965 | Hallamore | 353/120 |
| 3,252,372 | 5/1966 | Gallina | 353/15 |
| 3,582,195 | 6/1971 | Pignone | 353/15 |
| 3,692,390 | 9/1972 | Siegel | 352/31 |
| 3,702,721 | 11/1972 | Skuja | 353/19 |
| 3,799,420 | 3/1974 | Badalich | 352/31 |

Primary Examiner—Harry N. Haroian

[57] ABSTRACT

A cartridge having a film handling portion and an audio tape cassette storing portion for use with an audio-visual system. The film storing portion includes a supply and take-up reel which are coupled by an intermediate gear so that the rotation of one reel is coupled to the other and means for transporting the film spooled about the reels past an aperture plate in either a continuous or intermittent motion mode. Provision is made in the cartridge for allowing the projection of light through the image portion of the film positioned at the aperture in the aperture plate and through an auxiliary frame in the film positioned at an auxilliary aperture to identify the number of the image portion being projected. A standard audio tape cassette containing the audio portion of the audio-visual presentation associated with the film may be stored in the tape cassette storing portion facing towards the opposite side of the cartridge from the aperture plate.

9 Claims, 9 Drawing Figures

U.S. Patent  Dec. 28, 1976  Sheet 1 of 2  3,999,848
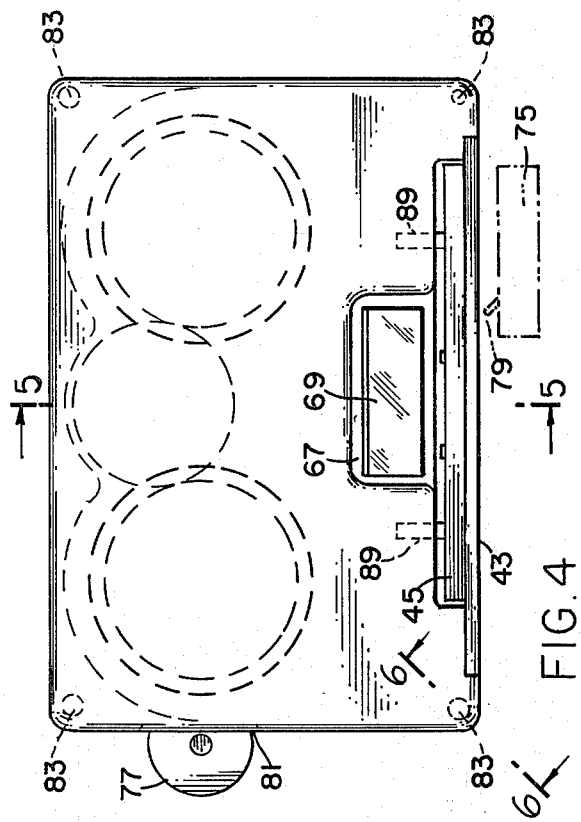
FIG. 4
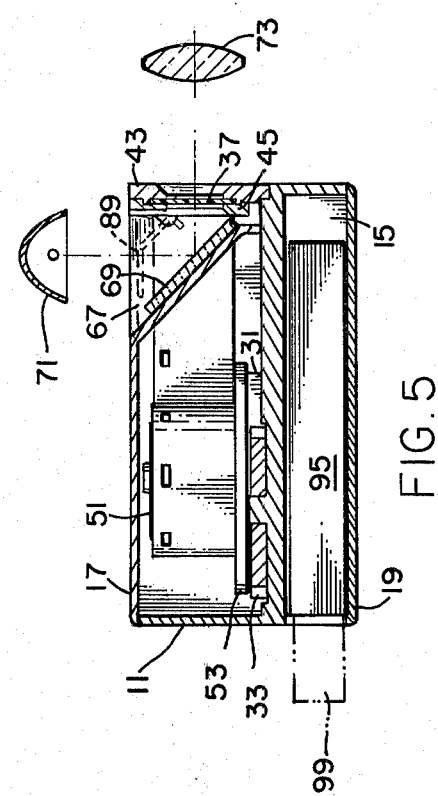
FIG. 5
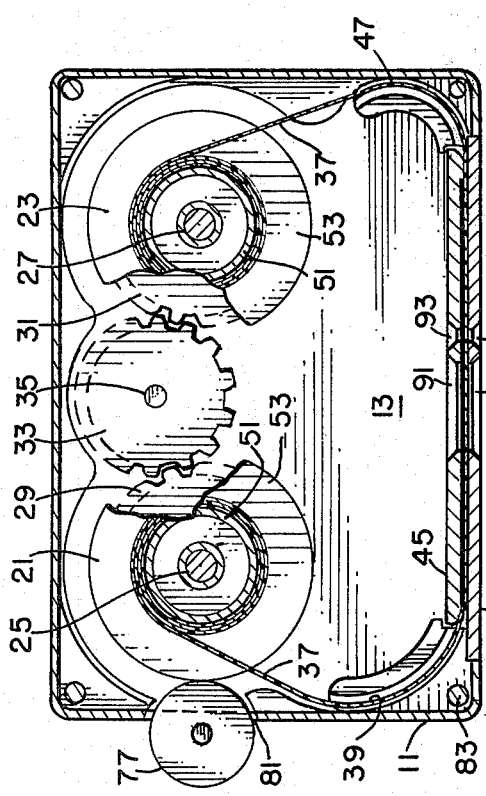
FIG. 2
FIG. 1
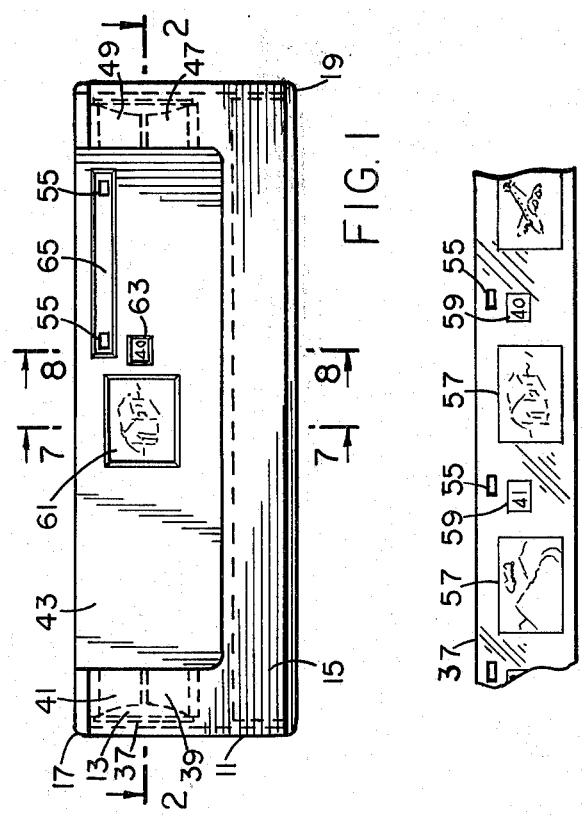
FIG. 3

AUDIO-VISUAL CARTRIDGE

BACKGROUND OF THE INVENTION

This invention relates generally to cartridges for use in audio-visual equipment, and more particularly to a cartridge carrying both picture film and audio tape.

Equipment for frame by frame visual display of pictorial information appearing on reels of picture film or on film strip are widely used to convey information to groups such as sales meetings, classes of students, lecture groups, etc. Generally this pictorial information is presented in connection with a verbal commentary which includes an explanation and discussion of the information contained in the frames. This information can be presented by a lecturer or by use of an audio tape recorder. The live delivery of the explanatory information by a lecturer has the obvious limitation of requiring someone who is deeply familiar with the subject matter to make the presentation.

The use of tape recorded comments overcomes this limitation to a certain extent but still the operator must have a close familiarity with the subject matter so that he is able to assemble the associated film and audio tape mediums and to insure that the audio-commentary is correctly synchronized with the successive frames of visual information on the film. Since there is generally no way provided for indicating which of the series of frames of pictorial information is being projected at any time, this problem of synchronization requires continuous attention on the part of the operator.

The film medium used in audio-visual equipment is generally either 8, 16 or 35mm film. The 35mm film medium provides a satisfactorily large picture frame area but has the disadvantages of requiring a rather large and bulky film handling mechanism and of being rather expensive because of the large size of the film. The 8 and 16mm films allow for a more compact film handling medium but have the disadvantage of having an extremely small picture frame area which results in a rather poor definition in the projected image.

Presently available film cartridges are rather complex in construction and they are generally not suitable for use with reels of film and with film strip. When used with film strip the danger exists with presently available film handling cartridges suitable for reel to reel film that, especially when the frame being projected is close to the leading or trailing edges of the film strip, the film will be transported in an improper manner and, as a result become damaged.

Objects and Summary of the Invention

It is therefore an object of the present invention to provide an improved audio-visual cartridge.

It is a further object of the invention to provide an improved audio-visual cartridge in which the synchronization between the film frames and the audio portion is simplified.

It is a further object of the invention to provide an audio-visual cartridge in which the synchronization between the audio-visual portions are simplified by making available at all times the number of the film frame being projected.

It is a further object of the invention to provide an improved audio-visual cartridge in which the film may be driven intermittently or at a higher continuous speed.

It is a further object of the invention to provide an improved audio-visual cartridge suitable for use both with reel to reel film and with film strip in which the likelihood of the film becoming scratched or damaged is greatly reduced.

It is still a further object of the invention to provide an improved audio-visual cartridge allowing a simplified projection of the film frame images.

In accordance with these and other objects of the invention, Applicant provides an audio-visual cartridge which comprises a film storing and handling portion and an audio tape storing portion. The film storing portion includes an aperture plate having primary and secondary apertures and a pressure plate resiliently biased toward the aperture plate during use. The pressure plate may extend the full distance between first and second guide means located on either side of the apertures for guiding the film in the area of the aperture plate. A slot is provided in the aperture plate for allowing the insertion of a claw advancing mechanism for transporting the film in an intermittent mode in either direction. The primary and secondary apertures and the slot are transversly aligned with the image area, an auxilliary image area and sprocket holes, respectively, on the film. The auxilliary image area of the film contains an identification of the image area positioned at the primary aperture to simplify the synchronization of the audio and film portion of the presentation. Supply and take-up reels whose rotations are coupled by an intermediate gear, may be provided for handling reel to reel film and means are provided for allowing the driving of one of the reels in a continuous mode in either direction. The audio tape storing portion includes means for storing an audio tape cassette facing the opposite side of the cartridge from the aperture plate.

BRIEF DESCRIPTION OF THE DRAWINGS

FIG. 1 is a view of the front of the tape cartridge in accordance with the preferred embodiment of the invention.

FIG. 2 is a cut away top view of the cartridge of FIG. 1.

FIG. 3 shows the format of film suitable for use with the cartridge of FIGS. 1 and 2.

FIG. 4 is a top view of the cartridge in accordance with the invention showing the drive means for guiding the film in either direction.

FIG. 5 is a sectional side view of the cartridge of FIG. 4.

DETAILED DESCRIPTION OF THE PREFERRED EMBODIMENT

Figure 8:
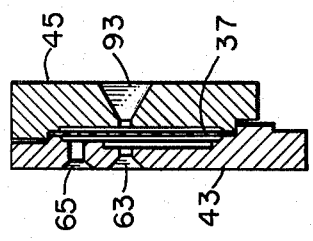
FIG. 8 is a sectional view of the aperture and pressure plates of the cartridge in accordance with the invention.

Referring now to FIGS. 1 and 2 of the drawings the audio-visual cassette according to the invention includes a body member 11 which includes a film storing portion 13 and an audio tape cassette storing portion 15. The top plate 17 covers and encloses the film storing portion 13 while the bottom plate 19 covers the audio tape cassette storing portion 15. A pair of film handling reels including a supply reel 21 and a take-up reel 23 are rotatably mounted in the film storing portion 13 of the cartridge on shafts 25 and 27, respectively. Also rotatably mounted on shafts 25 and 27 are gear wheels 29 and 31 which are affixed to, and rotate with, the reels 21 and 23, respectively. An intermediate gear wheel 33 is rotatably mounted on shaft 35, meshes with gear wheels 29 and 31 and transmits the rotation of one to the other. This insures that any rotation of the supply reel 21 is accompanied by an equal rotation in the same direction by the take-up reel 23. It is, thus, not necessary to provide separate drives for the supply and take-up reels 21 and 23 since the rotation of either of them causes the other to rotate also.

Film 37 from the supply roll 21 is passed over guides 39 and 41 and between the aperture plate 43 and the pressure plate 45. Pressure Plate 45 is resiliently biased towards the aperture plate 43 to hold the film 37 in close proximity thereto. The film 37 then passes over guides 47 and 49 to the take-up reel 23.

The supply reel 21 and the take-up reel 23 each include a hub 51 to which the film 37 is attached and a bottom flange 53 to which the gear wheels 29 and 31 are affixed. The flange 53 also acts to keep the film 37 in alignment as the film 37 is transported from one reel to the other.

Referring to FIG. 3 of the drawings, the preferred film 37 used in the cartridge of the illustrated embodiment of the invention is 16mm film in which the image area 57 is arranged with its larger dimension parallel with the edges of the film. This arrangement results in a frame area substantially larger than would normally be available. This larger frame area results in the projected image having much sharper definition than would be expected from such a relatively small film size. A single sprocket hole 55 is parallel between each of the image area frames 57.

Between each image area 57 there is an auxilliary frame 59 in which is recorded the number of the image area 57 immediately to the left thereof. The number recorded in the auxilliary frame 59 may be projected either on the main screen adjacent to the projected image of the image area 57 associated therewith or may be projected through an auxilliary viewing apparatus so that it is visible only to the machine operator. In either case the projection of the number in the auxilliary frame 59 at all times identifies the number of the corresponding frame 57 thereby greatly simplifying the synchronization between the audio protion and the image being projected from film 37.

Returning now to FIGS. 1 and 2, the aperture plate 43 includes the aperture 61 which is in vertical alignment with, and slightly smaller than the image area 57 on the film 37 also included in an auxilliary aperture 63 which is in vertical alignment with the auxilliary frame 59 and horizontally positioned with respect to aperture 61 such as, when the image area 57 is aligned with the aperture 61, the auxilliary image area 59 is aligned with the auxilliary aperture 63. The aperture plate 43 also includes a slot 65 in vertical alignment with the sprocket holes 55 which is used in conjunction with a claw mechanism for advancing the film 37 by the distance between adjacent image areas 57 as will be explained in greater detail hereinbelow.

Turning to FIGS. 4 and 5 of the drawings, the top plate 17 of the cartridge of illustrated embodiment of the invention includes a cut out 67 in vertical alignment with the apertures 61 and 63 in aperture plate 43 for allowing a mirror 69, preferably oriented at an angle of 45° with respect to the film 37 at the aperture 61, may be inserted for use in projecting light through the image area 57 and auxilliary image area 59 of the film 37.

As seen in FIG. 5 light may be projected from a lamp 71 positioned vertically above the mirror 69 onto the mirror 69 and reflected thereby through the image areas 57 and 59 of the film 37 in alignment with the aperture 61 and 63 of the aperture plate 33 and thence through a lens 73 for projection on a screen. In this case the mirror 69 may also be permanently affixed to, and form a part of the cartridge. Alternatively, the positions of the lamp 71 and the lens 73 could be reversed so that the image would be projected upwardly. In this second case the lens 73 and mirror 69 would preferably be mounted in a single housing inorder to maintain the distance between them accurately.

The film may be driven in either direction in an intermittent or continuous mode by claw mechanism 75 or drive wheel 77 respectively. Claw mechanism 75 is vertically and horizontally aligned with the slot 65 in the aperture plate 43 when the cartridge is inserted into the machine in which it is used. In order to advance the film 37 in either direction by the distance between adjacent image areas 57, the claw member 79 is inserted into one of the sprocket holes 55 in the film 37 through the slot 65 and then drawn along the distance of the slot in order to advance the film. As is best seen in FIG. 1 the length of the slot 65 is preferably such that when a sprocket hole 55 is positioned at one end of the slot 65, the adjacent sprocket hole 55 is at the other end of the slot 65. Thus, by inserting the claw member 79 into the sprocket hole 55 at one end of the slot 65 and drawing it to the other, the film 37 is transported to the right or the left by the distance between the center line of adjacent image areas 57, thereby bringing the adjacent image area 57 into registry with the aperture 61.

The horizontal distance between the right side of the aperture 61 and the left end of the slot 65 must be the same as or less than the horizontal distance between the image area 57 and the sprocket hole 55 in the film 37. It is, of course, possible to provide more sprocket holes 55 in the film 37. If the film 37 is misaligned, however, this might result in a sprocket hole being positioned on a smaller image area 57 so that the illustrated embodiment is preferred.

As is illustrated in FIGS. 2 and 4 of the drawings a drive wheel 77 may be inserted through the aperture 81 in the side of the film containing portion 11 of the cartridge when it is inserted into the machine in which it is used. The drive wheel 77 is vertically aligned with an engages the flange 53 of the reel 21 to rotate the reel 21 in a continuous mode in either direction, thereby transporting the film 37 past the aperture 61 in aperture plate 43. As explained above, it is a feature of the cartridge according to the present invention that the rotation of the suppy reel 21 by the drive wheel 77, or by the pulling of the film 37 by the claw mechanism 75, operates through the intermediate gear 33 to rotate the tape up reel 23 also. Thus, it is not necessary to provide separate drives for each reel.

Since in the illustrated embodiment of the invention, the gear ratio between the gear wheels 29 and 31 is 1:1, the reels 21 and 23 always rotate through the same angular distances. Therefore, if, for instance, more film 37 is spooled around reel 21 than around reel 23, a given counter-clockwise rotation of reel 21 causes more film 37 to unwind from reel 21 than is taken up on reel 23. This does not cause any problem, however, the only result being that while there is more film 37 on reel 21 than reel 23 the film 37 is wound rather loosely on reel 23. Later, however, when there is more film 37 spooled about reel 23 than reel 21 the equal rotations of reels 21 and 23 cause reel 23 to take up more film 37 than is unwound from reel 21. The film 37 would about reel 23 then becomes progressively tigher until, when all the film except a trailer is wound around reel 23, it is wound equally tightly as it was when all the film, except a leader, was wound around reel 21. The same procedure clearly pertains when the film 37 is being wound from reel 23 to reel 21.

Figure 6:
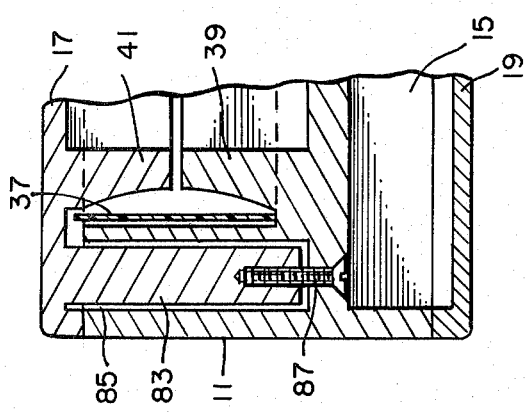
FIG. 6 is a sectional view of the cartridge of FIG. 4 showing the construction of the film guides.

Referring now to FIG. 6 of the drawings, there is more clearly illustrated the structure of film guide 39 and 41. In the preferred embodiment, the upper portion 41 of the film guide is an integral part of the top cover 17 of the cartridge while the lower portion 39 of the guide is an integral part of the main body portion 11 of the cartridge. The surface of the guides 39 and 41 facing the film 37 are concave so that the film 37 is in contact with the guides 39 and 41 only along its edges, thereby preserving the image areas 57 from the possibility of being scratched by the guides 39 and 41.

The top cover 17 of the illustrated embodiment of the cartridge of the invention includes posts 83 on each corner thereof which mate with corresponding holes 85 in the main body portion 11 of the cartridge. The top cover 17 is affixed to the main body portion 11 of the cartridge by means of screws 87 extending through the bottom of the body portion 11 into the bottom of the posts 83.

As illustrated in FIGS. 2 and 4 of the drawings, the pressure plate 45 extends the full length between the guides 39 and 41 on the left and 47 and 49 on the right side of the cartridge. Thus the film 37 is continuously guided from the time it enters the guides 39 and 41 till it leaves the guides 47 and 49. This is an important feature of the cartridge according to the invention in that it prevents any bunching of the film 37 in the area of the aperture 61 and makes the cartridge particularly suitable for use with film strips as well as with reel-to-reel film. In film strip applications a relatively short strip of film, often having on the order of 20 image area frames, is used rather than the longer reel film shown in the drawings. The continuous guiding of the film 37 in the area of the aperture 61 makes the cartridge particularly suitable for use with film strips both because bunching of the film strip is prevented and because, when the leading or trailing edge of the film is close to the aperture 63, it is continuously guided and prevented from going off in an improper direction.

The pressure plate 45 is loosely mounted in the end of the guide members 39 and 41 on one side and 47 and 49 on the other for allowing a limited moement towards and away from the aperture plate 43 as is most clearly illustrated in FIG. 2 of the drawings. In order to resiliently bias the pressure plate 45 into contact with the aperture plate 43 while the film 37 is therebetween a flat spring 89 (FIGS. 4 and 5) which is affixed to the top plate 17 may be provided. Alternatively, a spring may be provided in the machine in which the cartridge is used which is inserted into the aperture 67 in the top plate 17 to press the pressure plate 45 against the aperture plate 43.

Figure 7:
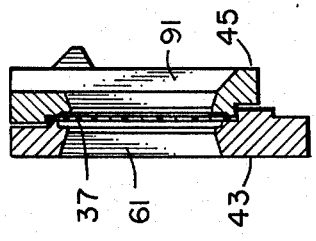
FIG. 7 is a sectional view of the aperture and pressure plates of the cartridge in accordance with the invention.

Referring to FIGS. 7 and 8 of the drawings, there are shown vertical cross-sections of the aperture plate 43 and pressure plate 45, taken at the aperture 61 and the auxiliary aperture 63, respectively. Pressure plate 45 includes an aperture 91 slightly larger than and in register with the aperture 61 in the aperture plate 43 and an aperture 93 which is slightly larger than, and in registry with, the auxiliary aperture 63. Apertures 91 and 93 provided in the pressure plate 45 for allowing light to pass through the image area 57 and the auxiliary image area 59 of the film 37 to or from the mirror 69 (FIG. 4). In order to prevent the scratching or other damage to the film 37 as it passes between the aperture plate 43 and pressure plate 45 recesses are provided in both the aperture and pressure plates so that they contact the film 37 only along the edges thereof.

Figure 9:
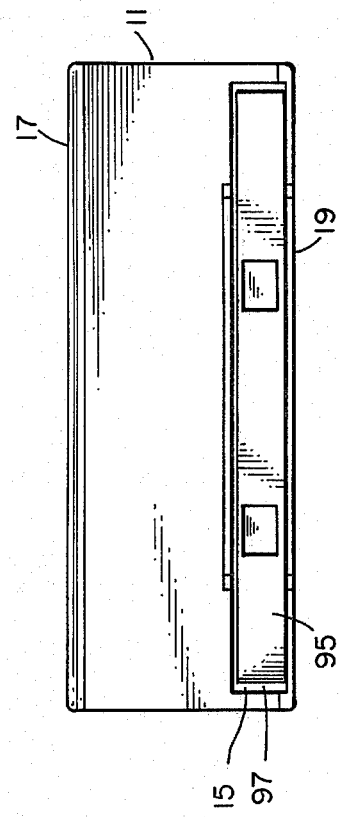
FIG. 9 is a view of the back of the cartridge in accordance with the invention showing the position of the audio tape cassette.

Referring now to FIGS. 5 and 9 of the drawings, the audio tape cassette storing portions 15 of the audio visual cartridge according to the invention, which is covered on the bottom by plate 19, can store a standard audio tape cassette 95 which faces out the back of the cartridge on the opposite side from the aperture plate 43 through a slot 97 in the back of the cartridge. A read head and tape drive mechanism 99 may be positioned within the machine in which the cartridge according to the invention is used to cooperate with the cassette 95 stored in the cassette storing portion 15 for providing the audio portion of the audio visual presentation being made in conjunction with the projection of the film 37 stored in the film storing portion of the cartridge.

The storage of the audio tape cassette 95 in the portion 15 of the cartridge insures that the proper tape cassette and film are used with one another and thereby permits the presentation of the audio-visual information to an audience by an operator who is not familiar with the sujbect matter to which the presentation pertains.

While the audio-visual cartridge according to the invention has been described with relation to a preferred embodiment it should be recognized that this is for purposes of illustration only and that modifications may be made in the cartridge without departing from the spirit and scope of the Applicant's invention as defined in the appended claims. Furthermore, the terminology used in the specification should also be taken in an illustrative rather than a limiting sense. For instance, it is clear that the terms "supply reel" and "take-up reel" as used in the specification and claims are used for purposes of ease of description only, since, as explained above, the film may be advanced in either a continuous or intermittent mode in either direction.

The term "film strip" as used in the specification may refer to a length of film which is either wound on reels, such as reels 21 and 23, has its ends joined together to form a loop, or has its ends free in the cartridge.

What is claimed is:

1. An audio visual cartridge for storing and handling picture film for projection on a screen and storing an audio tape containing audio information associated with the visual information on the film comprising:
   a film handling and storing portion having a front face and including:
      a first aperture in said front face positioned for allowing the projection of visual information recorded in a primary image area of said film;
      a second aperture in said front face having a predetermined positional relationship with said first aperture for allowing the projection of indicia recorded in an auxilliary image area on said film positioned between adajacent primary image areas for identifying a particular primary image area;

first and second guide means on either side of said apertures for guiding said film into and out of proximity with said front face, respectively;

rotably mounted supply and take up reels for said film;

first and second gear wheels affixed to said supply and take-up reels, respectively, for rotation therewith;

an intermediate gear wheel coupling said first and second gear wheels for transmitting the rotation of one of said reels to the other;

a pressure plate for maintaining said film in an aligned proximity with said front face in the area of said apertures;

a slot in said front face positioned for allowing the insertion of a claw advance mechanism into sprocket holes in said film to advance said film in either direction by the distance between adjacent primary image areas; and means for projecting light through said first and second apertures; and means in said cartridge for storing an audio tape containing audio information associated with the visual information recorded on said film including a slotted portion having an opening in the side of the cartridge opposite from said front face for storing an audio tape cassette facing the opposite side of the cartridge from said front face.

2. The audio visual cartridge of claim 1 wherein said pressure plate extends substantially the full distance from said first guide means to said second guide means for continuously guiding said film between said first and second guide means.

3. The audio visual cartridge of claim 2 wherein the ends of said pressure plate are secured in said guide means for limited motion towards and away from said front face.

4. The audio visual cartridge of claim 1 wherein one of said reels includes a flange and said film storing and handling portion further includes an aperture proximate said flange for allowing the insertion of a drive wheel for driving said supply and take-up wheel in a continuous mode in either direction.

5. The audio visual cartridge of clim 1 wherein said means for allowing projection of light through said film image area at said apertures includes a mirror mounted at an angle with said film at said apertures for redirecting light from a light source through said apertures.

6. The audio visual cartridge of claim 1 wherein said front face includes an aperture plate containing said first and second apertures and said slot.

7. The audio visual cartridge of claim 6 wherein said aperture plate and said pressure plate includes recesses for preventing contact between said aperture and pressure plates and the image area of said film.

8. The audio tape cartridge of claim 1 wherein said film storing portion further includes a top plate and a bottom, said first and second guide means each including a lower portion integral with the bottom of said film storing portion and an upper portion integral with said top plate, the edges of said film being in contact, one each, with said upper and lower portions of said guide means.

9. The audio visual cartridge of claim 8 wherein said upper and lower portion of said guide means include concave surfaces for contacting said film only along portions proximate the edges thereof.

* * * * *